(12) United States Patent
Hiroi et al.

(10) Patent No.: US 12,325,781 B2
(45) Date of Patent: Jun. 10, 2025

(54) COMPOSITION FOR FORMING COATING FILM CONTAINING PHOSPHORIC ACID GROUP-CONTAINING POLYMER

(71) Applicant: NISSAN CHEMICAL CORPORATION, Tokyo (JP)

(72) Inventors: Yoshiomi Hiroi, Funabashi (JP); Hiroyuki Nakajima, Shiraoka (JP); Taito Nishino, Shiraoka (JP); Miya Hiroi, Funabashi (JP); Yuki Ueda, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 56 days.

(21) Appl. No.: 18/002,366

(22) PCT Filed: Jun. 18, 2021

(86) PCT No.: PCT/JP2021/023144
§ 371 (c)(1),
(2) Date: Dec. 19, 2022

(87) PCT Pub. No.: WO2021/256553
PCT Pub. Date: Dec. 23, 2021

(65) Prior Publication Data
US 2023/0235141 A1    Jul. 27, 2023

(30) Foreign Application Priority Data
Jun. 19, 2020 (JP) .................................. 2020-105748

(51) Int. Cl.
| | |
|---|---|
| *C08F 230/02* | (2006.01) |
| *C08J 7/04* | (2020.01) |
| *C09D 7/20* | (2018.01) |
| *C09D 133/10* | (2006.01) |
| *C09D 179/08* | (2006.01) |

(52) U.S. Cl.
CPC .................. *C08J 7/04* (2013.01); *C09D 7/20* (2018.01); *C09D 133/10* (2013.01); *C09D 179/08* (2013.01); *C08J 2333/10* (2013.01); *C08J 2379/08* (2013.01)

(58) Field of Classification Search
CPC .. C08J 7/04; C08J 7/20; C08J 2333/10; C08F 230/02
See application file for complete search history.

(56) References Cited

U.S. PATENT DOCUMENTS

| | | | |
|---|---|---|---|
| 2005/0284335 A1* | 12/2005 | Kano ................... | C09B 67/0008 564/252 |
| 2009/0280256 A1 | 11/2009 | Narita et al. | |
| 2016/0122576 A1 | 5/2016 | Hiroi et al. | |
| 2017/0226391 A1* | 8/2017 | Vietti ................. | C08G 18/5081 |
| 2019/0031887 A1 | 1/2019 | Fujimoto | |
| 2019/0233792 A1 | 8/2019 | Hiroi et al. | |
| 2021/0130517 A1* | 5/2021 | Saija ...................... | D04H 1/587 |

FOREIGN PATENT DOCUMENTS

| | | |
|---|---|---|
| EP | 3613784 A1 | 2/2020 |
| JP | S61-211372 A | 9/1986 |
| JP | 2003-026982 A | 1/2003 |
| JP | 2010-505969 A | 2/2010 |
| WO | WO 2010/119969 A1 | 10/2010 |
| WO | WO 2014/196650 A1 | 12/2014 |
| WO | WO 2017/131104 A1 | 8/2017 |

OTHER PUBLICATIONS

Machine translation of Japan 2003-026982, orginally published in Japanese Jan. 29, 2003, 12 pages. (Year: 2003).*
European Patent Office, Supplementary European Search Report in European Patent Application No. 21825606.3 (Dec. 5, 2023).
Japan Patent Office, International Search Report in International Patent Application No. PCT/JP2021/023144 (Aug. 31, 2021).

* cited by examiner

*Primary Examiner* — Margaret G Moore
(74) *Attorney, Agent, or Firm* — Leydig, Voit & Mayer, Ltd.

(57) ABSTRACT

The invention provides a composition for forming a coating film containing a phosphoric acid group-containing polymer capable of forming a film on a substrate by a simple process and capable of maintaining film properties under a solvent environment containing water, and a coating film which is a cured product of the composition. In particular, the composition for forming a coating film contains (a) a polymer (P) containing a hydroxyl group, and the hydroxyl group is derived only from a phosphoric acid group, (b) a polycarbodiimide (C) containing a structure represented by the following formula (c-1):

—N═C═N—    (c-1), and (c) a solvent.

8 Claims, 2 Drawing Sheets

COMPOSITION FOR FORMING COATING FILM CONTAINING PHOSPHORIC ACID GROUP-CONTAINING POLYMER

TECHNICAL FIELD

The present invention relates to a composition for forming a coating film containing a phosphoric acid group-containing polymer, and a coating film which is a cured product of the composition.

BACKGROUND ART

Phosphoric acid group-containing polymers are used for various uses. As one of the uses, there is a use as a coating material having biocompatibility. In Patent Document 1, there is disclosed an ion complex material containing a phosphoric acid group-containing polymer. In Patent Document 2, there is disclosed an aqueous metallic paint composition using a phosphoric acid polymer.

PRIOR ART DOCUMENTS

Patent Documents

Patent Document 1: WO 2014/196650
Patent Document 2: JP 2010-505969A

SUMMARY OF THE INVENTION

Problems to be Solved by the Invention

An object of the present invention is to provide a composition for forming a coating film containing a phosphoric acid group-containing polymer capable of forming a film on a substrate, etc., by a simple process, and capable of maintaining film properties such as an ability to suppress adhesion of biological substances and hydrophilicity of the surface, etc., under a solvent environment containing water, and a coating film which is a cured product of the composition.

Means to Solve the Problems

The present invention includes the following.

[1]
A composition for forming a coating film which comprises a polymer (P) containing a hydroxyl group, and the hydroxyl group is derived only from a phosphoric acid group,
a polycarbodiimide (C) containing a structure represented by the following formula (c-1):

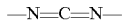

(c-1)

and
a solvent.

[2]
The composition for forming a coating film described in [1], wherein the polymer (P) contains a group represented by the formula (a) or the formula (a-1):

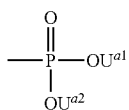

(a)

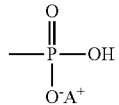

(a-1)

[in the formula (a), $U^{a1}$ and $U^{a2}$ each independently represent a hydrogen atom or an alkyl group having 1 to 5 carbon atoms, and at least one of $U^{a1}$ and $U^{a2}$ is a hydrogen atom, and in the formula (a-1), A represents an alkali metal].

[3]
The composition for forming a coating film described in [1] or [2], wherein the polymer (P) contains a unit structure represented by the formula (1):

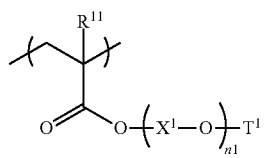

(1)

[wherein $R^{11}$ represents a hydrogen atom or an alkyl group having 1 to 5 carbon atoms, $X^1$ represents an alkylene group having 1 to 5 carbon atoms, n1 represents an integer of 1 to 10 and $T^1$ represents the group of the formula (a) or the formula (a-1)].

[4]
The composition for forming a coating film described in any one of [1] to [3], wherein the polycarbodiimide (C) contains a hydrophilic group.

[5]
The composition for forming a coating film described in [4], wherein the hydrophilic group is represented by the following formula (I):

$$R^1-(O-CHR^2-CH_2)_m- \quad (I)$$

(wherein $R^1$ represents an alkyl group having 1 to 5 carbon atoms, $R^2$ represents a hydrogen atom or a methyl group, when a plurality of $R^2$s is present, the $R^2$s may be the same or different from each other, and m represents an integer of 1 to 30).

[6]
The composition for forming a coating film described in any one of claims 1 to 5, which is for forming a coating film having an ability to suppress adhesion of biological substance.

[7]
The composition for forming a coating film described in [6], wherein the biological substance is a biopolymer.

[8]
A coating film which is a cured product of an applied film of the composition for forming a coating film described in any one of [1] to [7].

[9]
A method for producing a coating film which comprises a step of applying the composition for forming a coating film described in any one of [1] to [7] to a base material.

Effects of the Invention

The composition for forming a coating film containing a phosphoric acid group-containing polymer of the present invention has storage stability even when it contains water as a solvent, and the coating film according to the composition is excellent in durability to the solvent containing water, etc. The coating film according to the composition of the present invention has an ability to suppress adhesion of biopolymers without elution even in water. In particular, it has an excellent ability to suppress adhesion to biopolymers.

EMBODIMENTS TO CARRY OUT THE INVENTION

<Composition for Forming a Coating Film>

Figure 1:
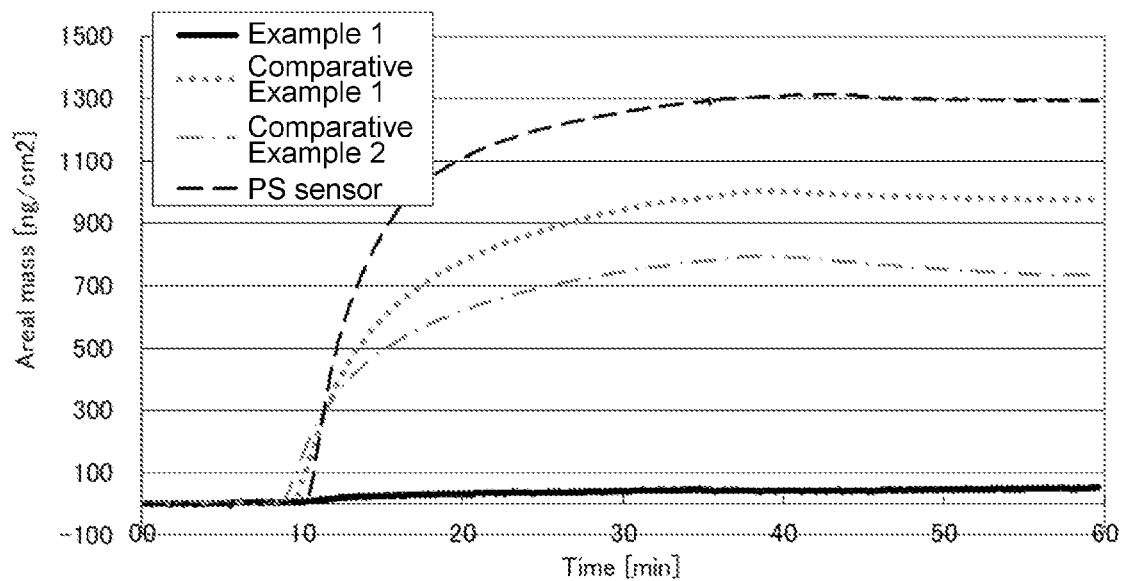
FIG. 1 shows a time-dependent graph of the mass per a unit surface area of the results of the protein adhesion test (QCM-D measurement) on a QCM sensor surface-treated with the compositions for forming a coating film of Example 1 and Comparative Examples 1 and 2 evaluated in Test Example 1.

The phosphoric acid group-containing polymer of the present invention is a polymer (P) characterized in that it is a polymer (P) containing a hydroxyl group(s), and the hydroxyl group(s) is/are derived only from a phosphoric acid group.

A composition containing a copolymer in which a monomer containing a phosphoric acid group and a monomer containing a hydroxyl group other than the phosphoric acid group are polymerized has been already known, but the hydroxyl group possessed by the phosphoric acid group-containing polymer of the present invention is derived only from a phosphoric acid group. The hydroxyl group derived from a phosphoric acid group causes a crosslinking reaction of the phosphoric acid group-containing polymers through the polycarbodiimide (C) described in detail below, whereby it becomes a coating film excellent in durability (water resistance) to a water-containing solvent, etc.

The composition for forming a coating film of the present invention comprises the above-mentioned polymer (P),
the polycarbodiimide (C) containing the structure represented by the following formula (c-1):

—N=C=N—    (c-1), and
a solvent. The solvent and the polycarbodiimide (C) will be described later.

It is preferable that the above-mentioned polymer (P) contains a group represented by the formula (a) or the formula (a-1):

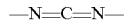

(a)

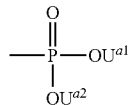

-continued

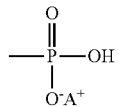

(a-1)

[in the formula (a), $U^{a1}$ and $U^{a2}$ each independently represent a hydrogen atom or an alkyl group having 1 to 5 carbon atoms, and at least one of $U^{a1}$ and $U^{a2}$ is a hydrogen atom. In the formula (a-1), A represents an alkali metal.].

It is preferable that it has the structure represented by the above-mentioned formula (a) or formula (a-1) at the side chain of the polymer main chain.

It is preferable that the structure represented by the above-mentioned formula (a) or formula (a-1) is contained in a recurring unit structure of the polymer.

As the above-mentioned alkyl group having 1 to 5 carbon atoms, there may be mentioned a methyl group, an ethyl group, an n-propyl group, an isopropyl group, an n-butyl group, an isobutyl group, an s-butyl group, a t-butyl group, an n-pentyl group, a 1-methylbutyl group, a 2-methylbutyl group, a 3-methylbutyl group, a 1,1-dimethylpropyl group, a 1,2-dimethylpropyl group, a 2,2-dimethylpropyl group or a 1-ethylpropyl group. $U^{a1}$ and $U^{a2}$ are preferably a methyl group or an ethyl group.

As the above-mentioned alkali metal, there may be mentioned lithium, sodium, potassium, rubidium, cesium and francium, and preferably sodium or potassium.

As the above-mentioned polymer (P), a polymer of the following compound(s) may be mentioned. As the specific examples of the compound, there may be mentioned acid phosphoxyethyl methacrylate, vinylphosphonic acid, acid phosphoxyethyl acrylate, 3-chloro-2-acid phosphoxypropyl methacrylate, acid phosphoxypropyl methacrylate, acid phosphoxymethyl methacrylate, acid phosphoxypolyoxyethylene glycol monomethacrylate, acid phosphoxypolyoxypropylene glycol monomethacrylate, etc. Commercially available products may be used. As the commercially available products, there may be mentioned Phosmer M (available from Uni Chemical Co., Ltd.), PPM-5P (available from TOHO Chemical Co., Ltd.)), etc.

It is preferable that the above-mentioned polymer (P) contains a unit structure represented by the formula (1):

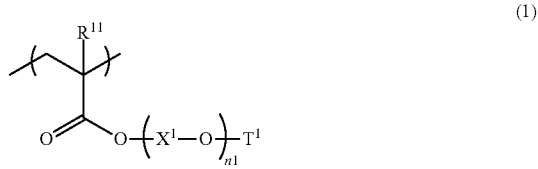

(1)

[wherein $R^{11}$ represents a hydrogen atom or an alkyl group having 1 to 5 carbon atoms, $X^1$ represents an alkylene group having 1 to 5 carbon atoms, n1 represents an integer of 1 to 10 and $T^L$ represents the group of the formula (a) or the formula (a-1)].

The above-mentioned alkyl group having 1 to 5 carbon atoms is the same as mentioned above. $R^{11}$ is preferably a hydrogen atom or a methyl group.

As the above-mentioned alkylene group having 1 to 5 carbon atoms, there may be mentioned a methylene group, an ethylene group, a propylene group, a trimethylene group, a tetramethylene group, a 1-methylpropylene group, a 2-methylpropylene group, a dimethylethylene group, an ethylethylene group, a pentamethylene group, a 1-methyl-tetramethylene group, a 2-methyl-tetramethylene group, a 1,1-dimethyl-trimethylene group, a 1,2-dimethyl-trimethylene group, a 2,2-dimethyl-trimethylene group, a 1-ethyl-trimethylene group, etc. Among these, $X^1$ is preferably selected from an ethylene group and a propylene group.

n1 is preferably an integer of 1 to 6.

The above-mentioned polymer (P) can be obtained by polymerizing a compound represented by the formula (1-1):

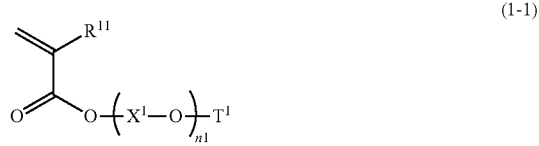

(1-1)

[wherein $R^{11}$, $X^1$, n1 and $T^1$ are the same as explained in the above-mentioned formula (1)] by a known method.

Further, the polymer (P) according to the present invention may be copolymerized with any optional monomer as long as the desired properties of the coating film the present invention is not impaired. Incidentally, in the optional monomer, the hydroxyl group is derived only from the phosphoric acid group. Examples of such a monomer may be mentioned a compound represented by the formula (2-1) or (3-1):

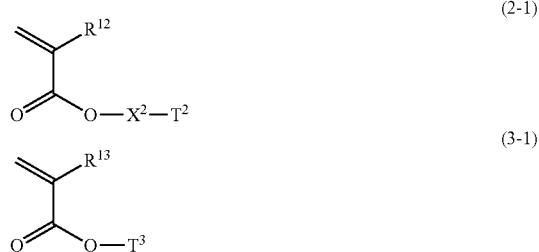

(2-1)

(3-1)

[wherein $R^{12}$ and $R^{13}$ independently represent a hydrogen atom or an alkyl group having 1 to 5 carbon atoms, $X^2$ and $X^3$ independently represent an alkylene group having 1 to 5 carbon atoms, $T^2$ represents a group of the following formula (b):

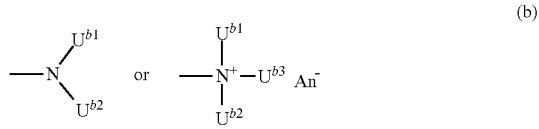

(b)

(wherein $U^{b1}$, $U^{b2}$ and $U^{b3}$ independently represent a hydrogen atom or an alkyl group having 1 to 5 carbon atoms, and An$^-$ represents an anion selected from the group consisting of a halide ion, an inorganic acid ion, a hydroxide ion and an isothiocyanate ion), and $T^3$ represents an alkyl group having 1 to 18 carbon atoms, a cyclic hydrocarbon group having 3 to 10 carbon atoms, an aryl group having 6 to 10 carbon atoms, an aralkyl group having 7 to 14 carbon atoms or an aryloxyalkyl group having 7 to 14 carbon atoms].

As the specific examples of the above-mentioned compound of the formula (2-1), there may be mentioned dimethylaminoethyl (meth)acrylate, diethylaminoethyl (meth)acrylate, dimethylaminopropyl (meth)acrylate, 2-(t-butylamino)ethyl (meth)acrylate, methacryloylcholine chloride, etc.

As the specific examples of the above-mentioned compound of the formula (3-1), there may be mentioned linear or branched alkyl esters of (meth)acrylic acid such as butyl (meth)acrylate, 2-ethylhexyl (meth)acrylate, lauryl (meth)acrylate, stearyl (meth)acrylate, etc.; cyclic alkyl esters of (meth)acrylic acid such as cyclohexyl (meth)acrylate, isobornyl (meth)acrylate, etc.; and aralkyl esters of (meth)acrylic acid such as benzyl (meth)acrylate, phenethyl (meth)acrylate, etc.

Examples of the other optional monomers may be mentioned (meth)acrylate compound having two or more functional groups such as ethylene glycol di(meth)acrylate, triethylene glycol di(meth)acrylate, propylene glycol di(meth)acrylate, bis(methacryloyloxymethyl) phosphate, bis[2-(methacryloyloxy)ethyl] phosphate, bis[2-(methacryloyloxy)propyl] phosphate, phosphinylidine tris (oxy-2,1-ethanediyl) triacrylate, etc. By copolymerizing such an optional monomer(s), a part of the polymer (P) may partially form a three-dimensional crosslinking. A ratio of the optional monomer(s) in the above-mentioned polymer (P) is 0 mol % to 50 mol %.

A weight average molecular of the polymer (P) according to the present invention may be several thousands to several million, preferably 5,000 to 5,000,000. It is further preferably 10,000 to 2,000,000. The weight average molecular weight can be measured, for example, by Gel Filtration Chromatography described in Examples. Also, when the polymer (P) is a copolymer, the copolymer may be any of a random copolymer, block copolymer and graft copolymer, and there is no particular limitation to the copolymerization reaction itself for producing the copolymer, and a method synthesizing in a known solution such as polymerization utilizing radical polymerization, on polymerization, photo-polymerization, macromer and emulsion polymerization, etc., can be used. The composition for forming a coating film of the present invention may contain any one of the polymers (P) alone, or contain a plurality of polymers (P) in admixture with changing the ratio thereof, depending on the intended use.

<Solvent>

The solvent contained in the composition for forming a coating film of the present invention may be mentioned water, phosphate buffered physiological saline (PBS) and an alcohol. As the alcohol, there may be mentioned an alcohol having 2 to 6 carbon atoms, for example, ethanol, propanol, isopropanol, 1-butanol, 2-butanol, isobutanol, t-butanol, 1-pentanol, 2-pentanol, 3-pentanol, 1-heptanol, 2-heptanol, 2,2-dimethyl-1-propanol (neopentyl alcohol), 2-methyl-1-propanol, 2-methyl-1-butanol, 2-methyl-2-butanol (t-amyl alcohol), 3-methyl-1-butanol, 3-methyl-3-pentanol, cyclopentanol, 1-hexanol, 2-hexanol, 3-hexanol, 2,3-dimethyl-2-butanol, 3,3-dimethyl-1-butanol, 3,3-dimethyl-2-butanol, 2-ethyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 4-methyl-3-pentanol and cyclohexanol, and these may be used alone or a mixed solvent in combination thereof, and from the viewpoint of solubility of the phosphoric acid-containing polymer, it is preferably selected from water, PBS and ethanol.

In order to adjust ion balance in the composition for forming a coating film according to the present invention, a pH adjusting agent may be contained. For example, it may be carried out by adding a pH adjusting agent to the composition containing the above-mentioned copolymer and the solvent, and making the pH of the composition 3.5 to 8.5, and further preferably 4.0 to 8.0. The kind and amount of the pH adjusting agent that can be used can be appropriately selected depending on the concentration of the above-mentioned copolymer, the existing ratio of the anion and the cation, etc. Examples of the pH adjusting agent may be mentioned ammonia, organic amines such as diethanolamine, pyridine, N-methyl-D-glucamine, tris(hydroxymethyl)aminomethane, etc.; alkali metal hydroxides such as potassium hydroxide, sodium hydroxide, etc.; alkali metal halides such as potassium chloride, sodium chloride, etc.; inorganic acids such as sulfuric acid, phosphoric acid, hydrochloric acid, carbonic acid, etc., or alkali metal salts thereof; quaternary ammonium cations such as choline, etc., or a mixture thereof (for example, a buffer such as phosphate buffered physiological saline, etc.). Among these, inorganic acids such as sulfuric acid, phosphoric acid, hydrochloric acid, carbonic acid, etc., are preferable.

<Polycarbodiimide (C)>

The polycarbodiimide (C) of the present invention contains a structure represented by the following formula (c-1):

$$—N{=}C{=}N— \quad (c\text{-}1)$$

The reaction of the phosphoric acid group-containing polymer (polymer (P)) of the present invention and the polycarbodiimide (C) is considered to proceed with the following formula. According to this reaction formula, the crosslinking reaction of the phosphoric acid group-containing polymers is considered to proceed.

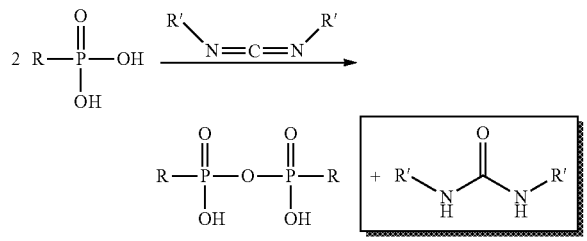

The polycarbodiimide (C) of the present invention may be a polycarbodiimide compound derived from an aliphatic diisocyanate compound having at least one primary isocyanate group, and the above-mentioned polycarbodiimide compound may have a structure in which all the terminals are sealed with an organic compound having a functional group which reacts with the isocyanate group.

For example, the aliphatic diisocyanate compound having at least one above-mentioned primary isocyanate group may be at least one kind selected from the group consisting of linear aliphatic isocyanate compounds such as ethylene diisocyanate, tetramethylene diisocyanate, hexamethylene diisocyanate, 2,2,4-trimethylhexa-methylenediisocyanate, etc., cyclic aliphatic diisocyanate compounds such as isophorone diisocyanate, 1,3-bis(isocyanatomethyl)cyclohexane, norbornane diisocyanate, etc., and aliphatic diisocyanate compounds having an aromatic ring such as xylylene diisocyanate, etc.

The polycarbodiimide (C) of the present invention may be, for example, an isocyanate-terminated polycarbodiimide having at least two carbodiimide groups represented by the above-mentioned formula (c-1) in the molecule which is obtained by a condensation reaction of the aliphatic diisocyanate compound having at least one above-mentioned primary isocyanate group accompanied by decarbonization, or may be a polycarbodiimide having a structure in which the terminal thereof is sealed with an organic compound having a functional group which reacts with the isocyanate group.

The above-mentioned functional group possessed by the above-mentioned organic compound may be at least one kind selected from a hydroxy group, an amino group, an isocyanate group, an epoxy group and a carboxy group.

Examples of the above-mentioned organic compound may be mentioned organic compounds having a hydroxyl group(s) such as polyethylene glycol monomethyl ether, polyethylene glycol monoethyl ether, polypropylene glycol monomethyl ether, polypropylene glycol monoethyl ether, triethylene glycol monomethyl ether, triethylene glycol monoethyl ether, tetraethylene glycol monomethyl ether, tetraethylene glycol monoethyl ether, diethylene glycol monomethyl ether, diethylene glycol monoethyl ether, ethyl alcohol, propyl alcohol, butyl alcohol, pentyl alcohol, hexyl alcohol, octyl alcohol, dodecyl alcohol, etc.; organic compounds having an amino group such as methylamine, ethylamine, propylamine, butylamine, pentylamine, hexylamine, octylamine, dodecylamine, diethylamine, dipropylamine, dibutylamine, cyclohexylamine, adamantaneamine, allylamine, polyoxyethylene laurylamine, polyoxymethylene stearylamine, aniline, diphenylamine, 3-aminopropyltrimethoxysilane, 3-aminopropyltriethoxysilane, N-phenyl-3-aminopropyltrimethoxysilane, 2,2-difluoroamine, fluorobenzylamine, trifluoroethylamine, [[4-(trifluoromethyl)cyclohexyl]methyl]amine or a derivative thereof, etc.; organic compounds having an isocyanate group such as butyl isocyanate, pentyl isocyanate, hexyl isocyanate, octyl isocyanate, dodecyl isocyanate, cyclohexyl isocyanate, 1-adamantyl isocyanate, 3-isocyanatepropyltriethoxysilane, 2-isocyanatoethyl acrylate, benzyl isocyanate, 2-phenylethyl isocyanate or a derivative thereof, etc.; organic compounds having an epoxy group 1,2-epoxyheptane, 1,2-epoxyhexane, 1,2-epoxydecane, 1,2-epoxy-5-hexene, ethyl glycidyl ether, 2-ethylhexyl glycidyl ether, glycidyl lauryl ether, allyl glycidyl ether, diethoxy(3-glycidyloxypropyl)methylsilane, 3-[2-(perfluorohexyl)ethoxy]-1,2-epoxypropane or a derivative thereof, etc.; organic compounds having a carboxy group such as acetic acid, ethanoic acid, propionic acid, butanoic acid, pentanoic acid, hexanoic acid, heptanoic acid, octanoic acid, nonanoic acid, decanoic acid, cyclohexanecarboxylic acid, adamantaneacetic acid, phenylacetic acid, benzoic acid, undecanoic acid or a derivative thereof, etc.

The above-mentioned organic compound may further have a hydrophilic group other than the above-mentioned functional group.

It is preferable that the above-mentioned polycarbodiimide (C) contains a hydrophilic group.

It is preferable that the above-mentioned hydrophilic group is represented by the following formula (I):

$$R^1—(O—CHR^2—CH_2)_m— \quad (I)$$

(wherein $R^1$ represents an alkyl group having 1 to 5 carbon atoms, $R^2$ represents a hydrogen atom or a methyl group, when a plurality of $R^2$s is present, the $R^2$s may be the same or different from each other, and m represents an integer of 1 to 30). As the above-mentioned alkyl group having 1 to 5 carbon atoms, it is as mentioned above.

As the organic compound having a hydrophilic group, in particular, the hydrophilic group represented by the above-mentioned formula (I) together with the functional group which reacts with the isocyanate group, there may be mentioned, for example, polyethylene glycol monomethyl ether (MPEG), tetraethylene glycol monomethyl ether (MTEG), etc., and these may be used alone or may be used in combination of two or more kinds. By sealing the terminals of the isocyanate-terminated polycarbodiimide with such an organic compound, the polycarbodiimide (C) into which the hydrophilic group represented by the above-mentioned formula (I) can be obtained.

As the above-mentioned polycarbodiimide (C), the polycarbodiimide compound described in WO 2018/194102 can be used. Other details of the polycarbodiimide compound of the present invention are in accordance with the contents described in WO 2018/194102.

As the above-mentioned polycarbodiimide (C), a commercially available product may be used. As the product name thereof, there may be mentioned, for example, "Carbodilite V-02", "Carbodilite V-02-L2", "Carbodilite V-04", "Carbodilite E-01", "Carbodilite E-02" (each available from Nisshinbo Chemical Inc., product name).

<Coating Film and Producing Method of Coating Film>

For forming the coating film of the present invention, the above-mentioned composition for forming a coating film is applied onto at least a part of the surface of a base material such as a substrate, etc. The applied method is not particularly limited, and a usual applied method such as spin coating, dip coating, solvent casting method, etc., is used.

A shape of the above-mentioned substrate is also not particularly limited, and any of a flat plate, a curved surface, an uneven shape, etc., can be used.

A drying step of the coating film according to the present invention is carried out under an atmosphere or vacuum, preferably at a temperature in the range of −200° C. to 200° C. By the drying step, the solvent in the above-mentioned composition for forming a coating film is removed, which causes a crosslinking reaction to become a cured product, whereby the coating film adheres to the substrate.

The coating film can be formed by drying, for example, at room temperature (10° C. to 35° C., for example, 25° C.), and for forming the coating film more quickly, it may be dried at, for example, 40° C. to 50° C. In addition, a drying step at an extremely low temperature to a low temperature (around −200° C. to −30° C.) by a freeze-drying method may be used. The freeze-drying is called as vacuum freeze-drying, which is a method of cooling what is normally desired to be dried with a refrigerant and removing the solvent by sublimation in a vacuum state. A general refrigerant to be used in the freeze-drying may be mentioned a mixed medium of dry ice and methanol (−78° C.), liquid nitrogen (−196° C.), etc.

If the drying temperature is lower than −200° C., an unusual refrigerant must be used which lacks versatility, and a long time is required for solvent sublimation so that efficiency is poor. If drying temperature exceeds 200° C., ionic bonding reaction on the surface of the coating film proceeds excessively, whereby the surface thereof loses hydrophilicity and an ability to suppress adhesion of biological substances is not exhibited. More preferable drying temperature is 10° C. to 180° C., and more preferable drying temperature is 25° C. to 150° C. According to this drying step, the phosphoric acid group-containing polymers of the present invention cause crosslinking reaction, for example, as shown in the above-mentioned reaction formula, through the polycarbodiimide compound to become a cured product, whereby a coating film can be formed.

The coating film of the present invention has durability to the above-mentioned <solvent> in addition to water. In particular, it has durability (water resistance) to water, so that the coating film of the present invention exhibits an effect for use when it is constantly exposed to a solvent containing water.

After the above-mentioned drying, in order to eliminate impurities remained on the coating film, unreacted monomer(s), etc., and in order to adjust ion balance of the polymer in the film, it is desirable to wash with running water washing or ultrasonic wave washing, etc., with one or more solvents selected from water and an aqueous solution containing an electrolyte(s). The above-mentioned water and aqueous solution containing an electrolyte(s) may be a material heated, for example, in the range of 40° C. to 95° C. The aqueous solution containing an electrolyte(s) is preferably PBS, physiological saline (containing only sodium chloride), Dulbecco's phosphate buffered physiological saline, Tris buffered physiological saline, HEPES buffered physiological saline and veronal buffered physiological saline, and PBS is particularly preferable. After fixation, the coating film does not dissolve out even when it is washed with water, PBS and an alcohol, etc., and still remains firmly fixed to the base material. Even if biological substances are adhered to the formed coating film, these can be easily eliminated thereafter by washing with water, etc., so that the surface of the base material on which the coating film of the present invention has been formed has an ability to suppress adhesion of biological substance.

A film thickness of the coating film of the present invention is 10 to 1,000 Å, further preferably 10 to 500 Å, and most preferably 20 to 400 Å.

As a material of the above-mentioned base material, there may be mentioned glass, a metal-containing compound or a semi-metal-containing compound, or a resin, and glass or a resin is preferably used from the viewpoint of versatility. The metal containing compound or the semi-metal containing compound may be mentioned, for example, ceramics comprising a metal oxide as a basic component, which are a sintered body baked by a heat treatment at a high temperature, a semiconductor such as silicon, an inorganic solid material including a molded product of an inorganic compound such as a metal oxide or a semi-metal oxide (silicon oxide, alumina, etc.), a metal carbide or a semi-metal carbide, a metal nitride or a semi-metal nitride (silicon nitride, etc.), a metal boride or a semi-metal boride, etc., aluminum, nickel-titanium and stainless (SUS304, SUS316, SUS316L, etc.).

As the resin, it may be either of a natural resin or a derivative thereof, or a synthetic resin, as the natural resin, there may be preferably used cellulose, cellulose triacetate (CTA), nitrocellulose (NC), cellulose to which dextran sulfate has been fixed, etc., and as the synthetic resin, there may be preferably used polyacrylonitrile (PAN), polyimide (PI), polyester-based polymer alloy (PEPA), polystyrene (PS), polysulfone (PSF), polyethylene terephthalate (PET), polymethyl methacrylate (PMMA), polyvinyl alcohol (PVA), polyurethane (PU), ethylene vinyl alcohol (EVAL), polyethylene(PE), polyester, polypropylene (PP), polyvinylidene fluoride (PVDF), polyether sulfone (PES), polycarbonate (PC), cycloolefin polymer (COP), polyvinyl chloride (PVC), polytetrafluoroethylene (PTFE), ultra-high molecular weight polyethylene (UHPE), polydimethylsiloxane (PDMS), acrylonitrile-butadiene-styrene resin (ABS) or Teflon (Registered trademark).

The coating film of the present invention is preferably a coating film having an ability to suppress adhesion of biological substances.

<Biological Substance>

In the present invention, as the biological substance, there may be mentioned a protein, a saccharide, a virus, a nucleic acid and a cell or a combination thereof.

As the above-mentioned protein, there may be mentioned fibrinogen, bovine serum albumin (BSA), human albumin, various kinds of globulins, P-lipoprotein, various kinds of antibodies (IgG, IgA and IgM), peroxidase, various kinds of complements, various kinds of lectins, fibronectin, lysozyme, von Willebrand factor (vWF), serum 7-globulin, pepsin, ovalbumin, insulin, histone, ribonuclease, collagen and cytochrome c, for example, as the saccharide, glucose, galactose, mannose, fructose, heparin and hyaluronic acid, for example, as the nucleic acid, deoxyribonucleic acid (DNA) and ribonucleic acid (RNA), and as the above-mentioned cells, fibroblast, bone marrow cells, B lymphocytes, T lymphocytes, neutrophils, red blood cells, platelets, macrophages, monocytes, bone cells, pericytes, dendritic cells, keratinocytes, fat cells, mesenchymal cells, epithelial cells, epidermal cells, endothelial cells, vascular endothelial cells, hepatic parenchymal cells, cartilage cells, cumulus cells, neural cells, glial cells, neurons, oligodendrocytes, microglia, astroglial cells, heart cells, esophagus cells, muscle cells (for example, smooth muscle cells or skeletal muscle cells), pancreatic beta cells, melanocytes, hematopoietic precursor cells, mononuclear cells, embryonic stem cells (ES cell), embryonic tumor cells, embryonic germline stem cells, induced pluripotent stem cells (iPS cell), neural stem cells, hematopoietic stem cells, mesenchymal stem cells, liver stem cells, pancreatic stem cells, muscle stem cells, germline stem cells, intestinal stem cells, cancer stem cells, hair follicle stem cells and various kinds of cell lines (for example, HCT116, Huh7, HEK293 (human embryonic kidney cell), HeLa (human cervical cancer cell lines), HepG2 (human liver cancer cell lines), UT7/TPO (human leukemia cell lines), CHO (Chinese hamster ovary cell lines), MDCK, MDBK, BHK, C-33A, HT-29, AE-1, 3D9, Ns0/1, Jurkat, NIH3T3, PC12, S2, Sf9, Sf21, High Five and Vero), etc.

Among these, the coating film of the present invention has an excellent ability to suppress adhesion to saccharides, proteins and nucleic acids, which are so-called biopolymers.

In the present invention, the terms having an ability to suppress adhesion of a protein means that, in the QCM-D measurement carried out by the method described in Examples, a mass (%) per a relative unit area ((a mass (ng/cm$^2$) per a unit area of Example/(a mass (ng/cm$^2$) per a unit area of no coating film)) when compared with no coating film is 50% or less, preferably 30% or less, and further preferably 20% or less;

in the present invention, the terms having an ability to suppress adhesion of a cell means that, a relative absorbance (WST O.D. 450 nm) (%) ((absorbance (WST O.D. 450 nm) of Example)/(absorbance (WST O.D. 450 nm) of Comparative Example)) when compared with no coating film by the fluorescence microscope carried out by the method described in WO 2016/093293 is 50% or less, preferably 30% or less, and further preferably 20% or less.

It is preferable that the above-mentioned biological substance is selected from proteins or nucleic acids.

EXAMPLES

Hereinafter, the present invention will be explained in more detail based on Synthetic Examples, Examples, Test Examples, etc., but the present invention is not limited by these.

The weight average molecular weight of the copolymer shown in the following Synthetic Examples is the result of measurement by Gel Filtration Chromatography (hereinafter abbreviated to as GFC), or Gel Permeation Chromatography (hereinafter abbreviated to as GPC). The measurement conditions, etc., are as follows.

<GFC Measurement Conditions>
Device: Prominence (manufactured by Shimadzu Corporation)
GFC column: TSK gel GMPWXL (7.8 mm I.D.×30 cm)×2 to 3
Flow rate: 1.0 mL/min
Eluent: Ionic substance-containing aqueous solution, or a mixed solution of EtOH
Column temperature: 40° C.
Detector: RI
Injection concentration: polymer solid content 0.05 to 0.5% by mass
Injection amount: 100 μL
Calibration curve: cubic approximate curve
Standard samples: Polyethylene oxide (available from Agilent)×10 kinds <Measurement Method of Raw Material Composition>

Measurement of the concentration (% by mass) of each phosphorus-containing compound which is a raw material containing the phosphorus-containing compound was carried out by $^{31}$P-NMR. Absolute concentration (absolute % by mass) of each phosphorus-containing compound contained in the raw material was calculated by using the following standard substances.

(Measurement Conditions)
Mode: Reverse gate decoupling mode (quantitative mode)
Device: varian 400 MHz
Solvent: CD$_3$OD (deuterated methanol) (30% by weight)
Rotation number: 0 Hz
Data point: 64,000
Flip angle: 90°
Waiting time: 70 sec
Number of scan: 16 times, n=4
Standard substance: Trimethyl phosphate+D$_2$O (75% TMP solution was prepared)

Synthetic Example 1

Ten grams of Acid phosphoxyethyl methacrylate (product name; Phosmer M, available from Uni Chemical Co., Ltd., non-volatile content by evaporation to dryness method at 100° C. for 1 hour: 91.8%, a mixture of acid phosphoxyethyl methacrylate (44.2% by mass), bis[2-(methacryloyloxy) ethyl] phosphate (28.6% by mass) and other substance(s) (27.2% by mass)) was cooled with water and under stirring, 11.49 g of 5 mol/L aqueous sodium hydroxide solution (5N) (available from Kanto Chemical Co., Inc.) was added dropwise and neutralized while maintaining to 35° C. or lower. To the mixture was added 18.72 g of pure water, and 0.05 g of 2,2'-azobis(N-(2-carboxyethyl)-2-methylpropionamidine n-hydrate (product name; VA-057, available from FUJIFILM Wako Pure Chemical Corporation) was added thereto to sufficiently dissolve at 35° C. or lower. Further, 10.79 g of ethanol was added and the mixture in which all the above-mentioned materials were charged and which became uniform by sufficient stirring was introduced into a three-necked flask through a dropping pump. On the other hand, 68.86 g of pure water was separately added to a three-necked flask equipped with a cooling tube, and under nitrogen flow, the temperature of the mixture was raised to the reflux temperature under stirring. While maintaining this state, the above-mentioned mixed solution was added dropwise into a boiled liquid of pure water over 0.5 hour by a dropping pump through a Teflon tube. After the dropping, the mixture was heated and stirred while maintaining the above-mentioned environment for 4 hours. By cooling after 4 hours, 119.91 g of a polymer (P-1)-containing varnish of about 9.26% by mass of the solid content was obtained. The weight average molecular weight of the obtained liquid by GFC was about 290,000.

Synthetic Example 2

To a four-necked flask equipped with a cooling tube were added 6.02 g of acid phosphoxypolypropylene glycol monomethacrylate (average added molar number of propylene oxide: 5) (product name: PPM-5P, available from TOHO Chemical Industry Co., Ltd., absolute % by mass (purity) 97.3% by mass), 2.54 g of about 80% aqueous solution of methacryloylcholine chloride (available from Tokyo Chemical Industry Co., Ltd.), 4.15 g of butyl methacrylate (available from Tokyo Chemical Industry Co., Ltd.), 48.7 g of ethanol (available from Junsei Chemical Co., Ltd.) and 32.3 mg of dimethyl-1,1'-azobis(1-cyclohexanecarboxylate) (product name:VE-073, available from FUJIFILM Wako Pure Chemical Corporation), and the mixture was unfirmly stirred to prepare a mixed solution. The inside of the flask was replaced with nitrogen, and the temperature of the mixture was raised to the reflux temperature under stirring. By heating and stirring while maintaining the above-mentioned environment for 24 hours, a polymer (P-2)-containing varnish of about 19.9% by mass of the solid content was obtained. The weight average molecular weight of the obtained liquid by GFC was about 150,000.

Example 1

To 4 g of the polymer (P-1)-containing varnish obtained in the above-mentioned Synthetic Example 1 were added 0.38 g of 1 mol/L hydrochloric acid (1N) (available from Kanto Chemical Co., Inc.) and 13.9 g of pure water, and the mixture was sufficiently stirred. To the mixture was added 0.18 g of Carbodilite V-02 (available from Nisshinbo Chemical Inc., solid content of about 40% by mass) and the resulting mixture is stirred until it becomes uniform. Thereafter, 17.81 g of ethanol was added thereto and the mixture was sufficiently stirred to prepare a composition for forming a coating film. The pH was 7.5. The obtained composition for forming a coating film was spin-coated onto a commercially available silicon wafer for evaluation of the semiconductor at 1,500 rpm for 60 seconds, and then, it was dried in an oven at 70° C. for 24 hours. Thereafter, it was sufficiently washed with PBS and pure water to obtain a silicon wafer on which a coating film was formed. When the film thickness of the coating film on the silicon wafer was confirmed by an optical interference film thickness meter, it was 171 Å.

Example 2

To 2 g of the polymer (P-2)-containing varnish obtained in the above-mentioned Synthetic Example 2 were added 11.58 g of ethanol, 21.35 g of pure water and 5.26 g of 1N aqueous ammonia (available from Kanto Chemical Co., Inc.), and the mixture was sufficiently stirred. To the mixture was added 1.50 g of a solution in which Carbodilite V-02 (available from Nisshinbo Chemical Inc., solid content of about 40% by mass) diluted 10-fold with pure water and the mixture was sufficiently stirred to obtain a composition for forming a coating film. The pH was 9.9. The obtained composition for forming a coating film was spin coated on a HMDS-treated silicon wafer at 1,500 rpm/60 sec and dried at 50° C. for 3 hours. Thereafter, it was sufficiently washed with PBS and pure water and then dried at 70° C. for 1 hour to obtain a coating film on the HMDS-treated silicon wafer. When the film thickness of the coating film on the HMDS-treated silicon wafer by a spectroscopic ellipsometer, it was 227Å.

Comparative Example 1

To 4 g of the polymer (P)-containing varnish-containing varnish obtained in the above-mentioned Synthetic Example 1 were added 0.38 g of 1 mol/L hydrochloric acid (1N) (available from Kanto Chemical Co., Inc.) and 14.57 g of pure water, and the mixture was sufficiently stirred. Thereafter, 17.81 g of ethanol was added and the mixture was sufficiently stirred to prepare a composition for forming a coating film. The pH was 7.5. The obtained composition for forming a coating film was spin coated on a commercially available silicon wafer for evaluating a semiconductor with 1,500 rpm for 60 seconds, and dried in an oven at 70° C. for 24 hours. Thereafter, it was sufficiently washed with PBS and pure water to obtain a silicon wafer on which a coating film was formed. When the film thickness of the coating film on the silicon wafer was confirmed by an optical interference film thickness meter, it was 26 Å.

Comparative Example 2

To 1 g of siliconise L-25 (available from Fuji Systems) which is a commercially available silicone coating agent was added 50 g of pure water, and the mixture was sufficiently stirred. The obtained composition for forming a coating film was spin coated on a commercially available silicon wafer for evaluating a semiconductor with 1,500 rpm for 60 seconds, and dried in an oven at 150° C. for 0.5 hour. Thereafter, it was sufficiently washed with PBS and pure water to obtain a silicon wafer on which a coating film was formed.

Test Example 1

<Preparation of QCM Sensor (PS)>

Au-deposited crystal oscillator (Q-Sense, QSX304, manufactured by Biolin Scientific) was washed using a UV/ozone cleaning device (UV253E, manufactured by Filgen, Inc.) for 3 minutes, and immediately thereafter, it was immersed in a solution in which 0.0772 g of 2-aminoethanethiol (available from Tokyo Chemical Industry Co., Ltd.) was dissolved in 1,000 mL of ethanol for 24 hours. After washing the surface of the sensor with ethanol, it was naturally dried, and a varnish in which 1.00 g of polystyrene (available from Aldrich) was dissolved in 99.00 g of toluene was spin coated on the film sensor side by a spin coater with 3,500 rpm/30 seconds and dried at 120° C./1 minute to prepare a QCM sensor (PS).

<Preparation of Surface-Treated QCM Sensor>

Each composition for forming a coating film of Examples 1 and 2 and Comparative Example 1 was spin coated on a QCM sensor (PS) with 3,500 rpm/30 sec, and as a drying step, each was baked in an oven at 70° C. for 24 hours. Thereafter, as a washing step, the uncured composition for forming a coating film excessively attached was washed with PBS and ultrapure water each two times, and further each sensor was immersed in PBS and washed with ultrasonic wave for 5 minutes to obtain a surface-treated QCM sensor which was surface-treated with each of the compositions for forming a coating film of Example 1 and 2 and Comparative Example 1. For the composition for forming a coating film of Comparative Example 2, a surface-treated QCM sensor was obtained in the same manner except for baking at 150° C./30 minutes in the drying step.

<Protein Adhesion Test; QCM-D Measurement>

Each QCM sensor surface-treated with the compositions for forming a coating film of Example 1, and Comparative Examples 1 and 2 was attached to a dissipative quartz crystal microbalance QCM-D (E4, Q-Sense, manufactured by Biolin Scientific), and PBS was flowed until a stable baseline was established in which change in the frequency was 1 Hz or less in 1 hour. Next, PBS was flowed for about 10 minutes by making the frequency of the stable baseline 0 Hz. Subsequently, a solution of 7-globulin derived from human blood (available from Aldrich) diluted to 100 µg/mL with PBS was flowed for about 30 minutes, and thereafter, the shift (Δf) of the adsorption-induced frequency at ninth overtone was read after PBS was flowed again for about 20 minutes. As a control, a PS sensor without a coating film was also applied to the same test. Using Q-Tools (Q-Sense, manufactured by Biolin Scientific) for analysis, a shift (Δf) of the adhesion induced frequency is shown in Table 1 as an attached amount of the protein, which is a conversion of a shift (Δf) of the adsorption-induced frequency into a mass (ng/cm$^2$) per a unit surface area explained by the Sauerbrey equation, and a time-dependent graph of the mass per a unit surface area is shown in FIG. 1. The QCM sensor (Example 1) surface-treated by the composition for forming a coating film according to the present invention showed markedly low protein attached amount as compared with the QCM sensors (Comparative Examples 1 and 2) surface-treated by the compositions for forming a coating film of Comparative Examples or the PS sensor without a coating film.

TABLE 1

| Protein adsorption-induced frequency shift value (Δf) [ng/cm2] | |
| --- | --- |
| Example 1 | 53 |
| Comparative Example 1 | 976 |
| Comparative Example 2 | 735 |
| PS sensor | 889 |

Test Example 2

<DNA Adhesion Test; QCM-D Measurement>

Figure 2:
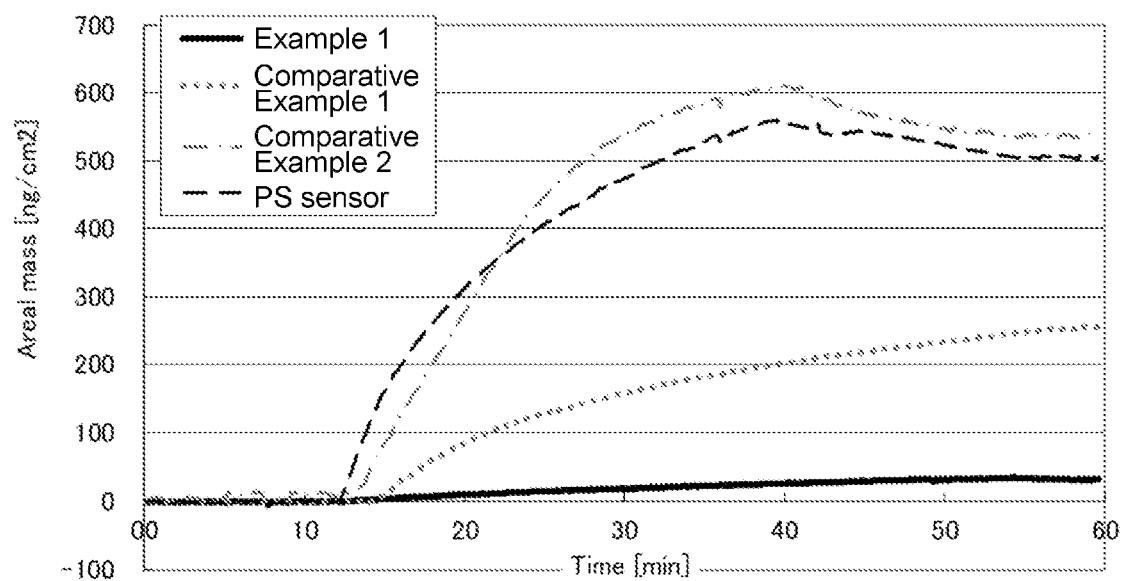
FIG. 2 shows a time-dependent graph of the mass per a unit surface area of the results of the DNA adhesion test (QCM-D measurement) on a QCM sensor surface-treated with the compositions for forming a coating film of Example 1 and Comparative Examples 1 and 2 evaluated in Test Example 2.

Each QCM sensor surface-treated with the compositions for forming a coating film of Example 1, and Comparative Examples 1 and 2 prepared in the same manner as in Test Example 1 was attached to a dissipative quartz crystal microbalance QCM-D (E4, Q-Sense, manufactured by Biolin Scientific), and PBS was flowed until a stable baseline was established in which change in the frequency was 1 Hz or less in 1 hour. Next, PBS was flowed for about 10 minutes by making the frequency of the stable baseline 0 Hz. Subsequently, a solution of deoxyribonucleic acid sodium salt derived from human placenta (available from Aldrich) diluted to 100 µg/mL with PBS was flowed about 30 minutes, and thereafter, the shift (Δf) of the adsorption-induced frequency at ninth overtone was read after PBS was flowed again for about 20 minutes. As a control, a PS sensor without a coating film was also applied to the same test. Using Q-Tools (Q-Sense, manufactured by Biolin Scientific) for analysis, a shift (Δf) of the adsorption-induced frequency is shown in Table 2 as an attached amount of DNA, which is a conversion of a shift (Δf) of the adsorption-induced frequency into a mass (ng/cm$^2$) per a unit surface area explained by the Sauerbrey equation, and a time-dependent graph of the mass per a unit surface area is shown in FIG. 2 The QCM sensor (Example 1) surface-treated by the composition for forming a coating film according to the present invention showed markedly low DNA attached amount as compared with the QCM sensors (Comparative Examples 1 and 2) surface-treated by the compositions for forming a coating film of Comparative Examples or the PS sensor without a coating film.

TABLE 2

| DNA adsorption-induced frequency shift value (Δf) [ng/cm2] | |
| --- | --- |
| Example 1 | 31 |
| Comparative Example 1 | 256 |
| Comparative Example 2 | 538 |
| PS sensor | 508 |

Test Example 3

<DNA Absorption Suppressing Test; Fluorescent Intensity Measurement>

The composition for forming a coating film of Example 1 and the composition for forming a coating film of Comparative Example 1 were each charged in 1.5 mL tube (manufactured by Thermo Fisher Scientific) made of polypropylene (PP) with 150 µL/tube, and the whole amount was dried at 50° C. Thereafter, it was sufficiently washed with pure water to obtain a 1.5 mL tube made of PP on which a coating film was formed. Subsequently, Human Genomic DNA (TAKARA BIO INC.) was adjusted to 2 ng/L using a 10 mM Tris-EDTA buffer (pH 7.4) (FUJIFILM Wako Pure Chemical Corporation) to which 0.1M NaCl was added, and 100 µL thereof was charged in the 1.5 mL tube made of PP on which the coating film was formed. As a control, Human Genomic DNA was also charged to a 1.5 mL tube (non-coated tube) made of PP on which no coating film was prepared. Each tube was stored at 40° C. for 7 days. After the storage, the Human Genomic DNA solution was recovered, and on a black microplate (manufactured by Corning) made of polystyrene, 95 µL of Quanti Fluor (Registered trademark) ONE dsDNA System (manufactured by Promega) was added to 5 µL of the DNA solution was added. Using Enspire multi-mode plate reader (manufactured by Perkin Elmer), Ex. 504 nm and Em. 531 nm were measured and the DNA concentration was calculated.

As a result of the present test, the concentration of Human Genomic DNA remained without attaching to the tube after storing in each tube is shown in Table 3.

TABLE 3

| DNA concentration [ng/µL] | |
| --- | --- |
| Example 1 | 2.06 ± 0.0921 |
| Comparative Example 1 | 1.89 ± 0.0208 |
| No coating | 0.274 ± 0.0464 |

Test Example 4

<Protein Adhesion Test; QCM-D Measurement>

Figure 3:
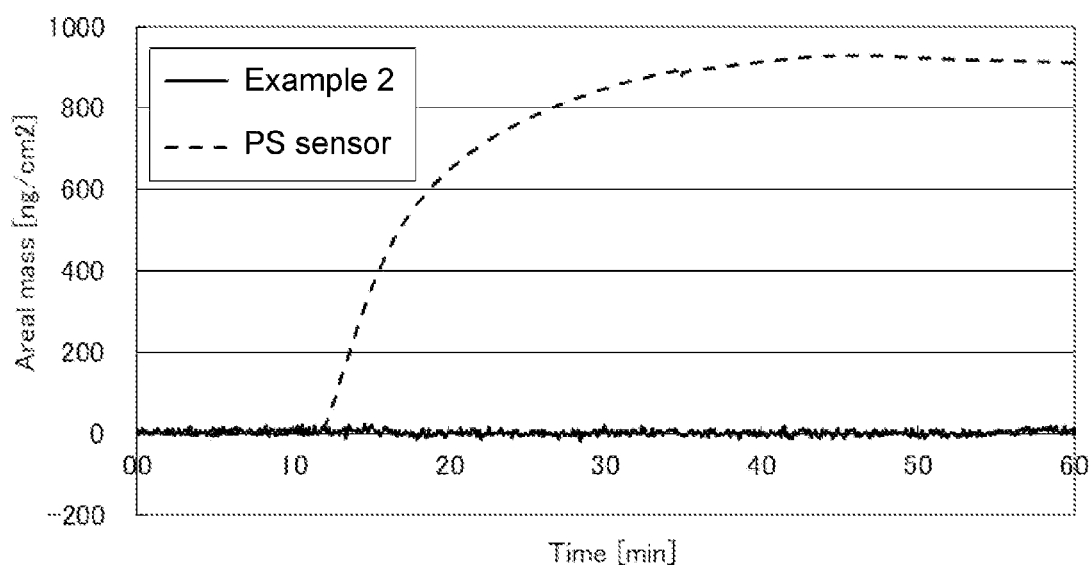
FIG. 3 shows a time-dependent graph of the mass per a unit surface area of the results of the protein adhesion test (QCM-D measurement) on a QCM sensor surface-treated with the composition for forming a coating film of Example 2 evaluated in Test Example 4.

The QCM sensor surface-treated with the composition for forming a coating film of Example 2, which was prepared in the same manner as in Test Example 1 was attached to a dissipative quartz crystal microbalance QCM-D (E4, Q-Sense, manufactured by Biolin Scientific), and PBS was flowed for about 100 hours. Next, PBS was flowed for about 10 minutes by making the frequency of the stable baseline 0 Hz. Subsequently, a solution of γ-globulin derived from human blood (available from Aldrich) diluted to 100 g/mL with PBS was flowed for about 30 minutes, and thereafter, the shift (Δf) of the adsorption-induced frequency at ninth overtone was read after PBS was flowed again for about 20 minutes. As a control, a PS sensor without a coating film was also applied to the same test. Using a Q-Tools (Q-Sense, manufactured by Biolin Scientific) for analysis, a shift (Δf) of the adsorption-induced frequency is shown in Table 4 as an attached amount of protein, which is a conversion of a shift (Δf) of the adsorption-induced frequency into a mass (ng/cm²) per a unit surface area explained by the Sauerbrey equation, and a time-dependent graph of the mass per a unit surface area is shown in FIG. 3. The QCM sensor (Example 2) surface-treated with the composition for forming a coating film according to the present invention showed markedly low protein attached amount as compared with the PS sensor without a coating film.

TABLE 4

Protein adsorption-induced frequency shift value (Δf) [ng/cm²]

| Example 2 | 4 |
|---|---|
| PS sensor | 913 |

UTILIZABILITY IN INDUSTRY

According to the present invention, it can provide a coating film excellent in durability to a solvent, etc., containing water, a coating film having an ability to suppress adhesion of biological substance, and a coating film having an excellent ability to suppress adhesion to proteins and nucleic acids, by a composition for forming a coating film containing a phosphoric acid group-containing polymer of the present invention.

The invention claimed is:
1. A composition for forming a coating film which comprises
   a polymer (P) containing a hydroxyl group, and the hydroxyl group is derived only from a phosphoric acid group,
   a polycarbodiimide (C) containing a hydrophilic group and a structure represented by the following formula (c-1):

—N=C=N—          (c-1), and a solvent.
2. The composition for forming a coating film according to claim 1, wherein the polymer (P) contains a group represented by the formula (a) or the formula (a-1):

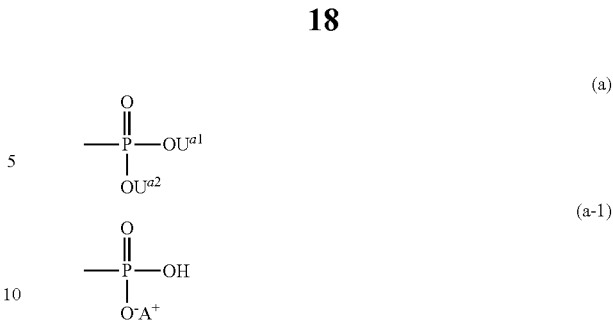

in the formula (a), $U^{a1}$ and $U^{a2}$ each independently represent a hydrogen atom or an alkyl group having 1 to 5 carbon atoms, and at least one of $U^{a1}$ and $U^{a2}$ is a hydrogen atom, and in the formula (a-1), A represents an alkali metal.

3. The composition for forming a coating film according to claim 1, wherein the polymer (P) contains a unit structure represented by the formula (1):

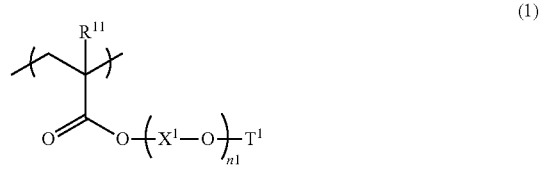

wherein $R^{11}$ represents a hydrogen atom or an alkyl group having 1 to 5 carbon atoms, $X^1$ represents an alkylene group having 1 to 5 carbon atoms, n1 represents an integer of 1 to 10 and $T^1$ represents the group of the formula (a) or the formula (a-1).

4. The composition for forming a coating film according to claim 1, wherein the hydrophilic group is represented by the following formula (I):

$$R^1—(O—CHR^2—CH_2)_m— \quad (I)$$

wherein $R^1$ represents an alkyl group having 1 to 5 carbon atoms, $R^2$ represents a hydrogen atom or a methyl group, when a plurality of $R^2$s is present, the $R^2$s may be the same or different from each other, and m represents an integer of 1 to 30.

5. The composition for forming a coating film according to claim 1, which is for forming a coating film having an ability to suppress adhesion of a biological substance.

6. The composition for forming a coating film according to claim 5, wherein the biological substance is a biopolymer.

7. A coating film which is a cured product of an applied film of the composition for forming a coating film according to claim 1.

8. A method for producing a coating film which comprises a step of applying the composition for forming a coating film according to claim 1 to a base material.

* * * * *